(12) United States Patent
Sakaue et al.

(10) Patent No.: US 7,765,146 B2
(45) Date of Patent: Jul. 27, 2010

(54) METHOD AND SYSTEM OF ADJUSTING MEDICAL COST THROUGH AUCTION

(75) Inventors: Kenji Sakaue, Yokohama (JP); Reiko Sakaue, Yokohama (JP)

(73) Assignee: Research Center for Prevention of Diabetes, Yokohama (JP)

( * ) Notice: Subject to any disclaimer, the term of this patent is extended or adjusted under 35 U.S.C. 154(b) by 1069 days.

(21) Appl. No.: 11/449,669

(22) Filed: Jun. 9, 2006

(65) Prior Publication Data
US 2007/0288262 A1   Dec. 13, 2007

(51) Int. Cl.
*G06Q 40/00* (2006.01)
*G06Q 50/00* (2006.01)

(52) U.S. Cl. .................................. 705/37; 705/2; 705/4
(58) Field of Classification Search .................. 705/2–3, 705/37, 26
See application file for complete search history.

(56) References Cited

U.S. PATENT DOCUMENTS 7,277,867 B1 * 10/2007 Brown et al. .................. 705/37

2005/0182660 A1 * 8/2005 Henley .......................... 705/2

* cited by examiner

*Primary Examiner*—Gerald J. O'Connor
*Assistant Examiner*—Minnah Seoh
(74) *Attorney, Agent, or Firm*—Jacobson Holman PLLC

(57) ABSTRACT

To provide a medical cost adjusting method for suppressing a medical cost to a reasonable price so that a person who suffers from a disease can receive an appropriate medical service even if the person is not insured. A medical institution presents a predicted medical cost to be demanded therefrom for a medical service given to a patient as a desired demanding amount and, on the other hand, the patient, who desires to receive the medical service, presents a payable medical cost as a desired medical treatment amount, thus, matching of the desired demanding amount to the desired medical treatment amount is carried out. Accordingly, it is possible of integrating a reverse auction and a regular auction making it possible of efficiently collect members concerned in the auction trade. In the reverse auction, a medical cost is used as an article of trade between a medical institution and a patient. That is, the integrated auction according to the present invention is an auction structure between members wherein a demand for an article of trade is attempted to meet a supply of the same, and this brings about a condition where there is a high possibility of making a successful bid and an effect of markedly reducing a medical cost as compared to a conventional medical cost.

8 Claims, 11 Drawing Sheets

FIG. 2

NAME : __A__ AGE : __48__ SEX : __MALE__ MBANK MEMBER NO. __AB64__
Joining Years: __12Years__ NATIONALITY : __US__ SOCIAL SECURITY __12345677-ABC22__

CONTRACTED INSURANCE COMPANY : __US___ __Life__ CURRENT DISEASE : __GASTRIC CANCER__ Mr. A DIAGNOSIS : __OPERATION NEEDED__ CLINICAL HISTORY : __DOC. Y__
RECURRED MORTALITY : __2MILLION USD__ BENEFICIALLY : __CHILD__

HOSPITAL : __P HOSPITAL__ DOCTOR IN CHARGE : __DOC. Y__

LIMITED MEDICAL INSURANCE AMOUNT : __1 MILLION USD__
UPPER RATE OF INDIVIDUALLY PAID MEDICAL COST : __20%__
MONTHLY INSURANCE DUE : __USD 600__ ASSETS __D_INSURANCE__
PAYMENT STATUS : __ON PAYING__. No __DELAY__ ANNOUNCEMENT
OF REMAINING LIFE ESTIMATE : __Non__ HISTORY OF LAW
SUITE AGAINST HOSPITAL : __Non__

| CHART HISTORY OF Mr.A | DONATION RECORD OF Mr.A | AMOUNT OF PAID INSURANCE |
|---|---|---|
| CURRENT CHART OF Mr.A | MEDICUAL COSTS | Mr.A'S POLICY ASSESSMENT |
| PROVISION START | CONTINUE | NO / YES |

ARE YOU SURE TO CHOOSE A HOSPITAL/DOCTOR OF A SUPPLY DESTINATION?

---

NEEDS: MEDICAL TREATMENT & OPERATION FEE DEMANDED FEE FROM THE HOSPITAL : $34,000

CURRENT ASSETS CONDITION OF A : ALMOST NO SAVINGS BECAUSE HE HAD CANCER OPERATION 2 YEARS AGO.

A'S DESIRE : HOPES FOR MEDICAL TREATMENT AT LOW PRICE. HOPES TO LIVE UNTIL THE CHILD GROW UP. DESIRED AMOUNT OF MEDICAL FEE: UPPER LIMIT $10,000

NECESSARY TIME PRIOD: NOW
DONATION SCORE OF A: B-3 (GOOD)

SUPPLY CONDITION SCREEN:
SUPPLY OK. 5 HOSPITALS THERE.
HOSPITAL NAME: A, B, C, D, E
SUPPLY PRICE: A→$@, B→$@, C→$@
CURRENT CONDITION: PRICES ARE BEING LOWERED.
SUPPLY CONDITION:
SUPPLIER HOSPITAL INFORMATION:
ACHIVEMENTS CONTRAST:
CLICK→DETAILED INFO IN DOCTOR.

FIG. 3(A)

| BASIC INFORMATION |
|---|
| (B1) USER OBJECT TYPE:<br>　USER / SYSTEM |
| (B2) USER IDENTIFIER / OBJECT IDENTIFIER:<br>　ONLY ONE USER IDENTIFIERS TO BE GIVEN AT THE TIME OF ADMISSION EXAMINATION, HOWEVER, THE NUMBER OF OBJECT IDENTIFIERS TO BE GIVEN TO THE NUMBER OF ENTERED FUNCTIONAL OBJECTS. |
| (B3) PASSWORD:<br>　THIS IS A SYSTEM MEMBER PASSWORD TO BE USED AT THE TIME OF OBJECT ENTRY. |
| (B4) USER ADDRESS / OTHER USER ACCESS INFORMATION: |
| (B5) PERSONAL INFORMATION:<br>FOR EXAMPLE, A SEX, AN AGE, A FAMILY MAKE-UP, AN ADDRESS, AN OCCUPATION, AN INCOME, A HOBBY, HEALTH CONDITIONS, A CLINICAL HISTORY, A CHART, CONTENTS OF A CONTRACTED INSURANCE, AN EVALUATION POINT OF A COMMODITY TRADE SESSION, LIFE POLICY TRADE SESSION, ETC. |
| (B6) PERSONAL AUTHENTICATION DATA:<br>PERSONAL AUTHENTICATION DATA CREATED FROM A PERSONAL PORTRAIT /VOICE, VOLUME, SHAPE, WRITING, SEAL OF STAMP, VOICE PRINTING, IRIS OF AN EYE, FINGERPRINT, A MEMBRANE OF LIVING BODY, LIVING BODY INFORMATION, BLOOD VESSELS OF HAND AND OTHER PARTS OF A LIVING BODY, DNA. |
| (B7) INFORMATION PERMITTED TO BE DISCLOSED:<br>WHEN THIS OBJECT IS SEARCHED FROM OTHER USER OBJECTS, SPECIFY AN ITEM PERMISSIBLE TO BE DISCLOSED AS A REFERENCE ITEM AND SPECIFIC INFORMATION IN THE ITEM (ALL PIECES OF DISCLOSED INFORMATION WILL BE HEREINAFTER REFERRED TO REFERENCE TAGS). UNDISCLOSED INFORMATION IS ENCODED AND STORED IN A DOMAIN SERVER OF A CLIENT, I.E., AND OBJECT OWNER (CORRESPONDING TO A WWW SERVER OF A WEB APPLICATION). OTHERWISE, DO NOT REGISTER INFORMATION UNDESIRED TO BE DISCLOSED AT THE TIME OF ADMISSION EXAMINATION. |
| (B8) DONATION HISTORY:<br>STORE GIVEN AND RECEIVED AMOUNTS OF ANNUAL DONATIONS. WHEN A DONATION IS MADE DURING THE COMMODITY TRADE SESSION, AN AMOUNT OF A DONATION CHANGES IN A REAL TIME MODE. USE THE DONATION FACTORY AS, FOR EXAMPLE, INFORMATION ABOUT A TAX DEDUCTION OF A FINAL INCOME TAX RETURN OR A DONATION HISTORY IN THE COMMODITY TRADE SESSION AND THE LIFE INSURANCE POLICY TRADE SESSION. |
| (B9) INFORMATION NECESSARY FOR CYBER MONEY SETTLEMENT:<br>　ELECTRIC BANK ACCOUNT NO., BANK ACCOUNT NO.,<br>　　CREDIT CARD NO., INSURED NO.,ETC. |

FIG. 3(B)

| FUNCTION INFORMATION |
|---|
| (F1) CLOSED / OPEN:<br>IN THE CASE OF CLOSED, THE FUNCTION INFORMATION IS EXCLUDED FROM TARGETS OF REFERENCE AND SEARCH FROM OBJECTS OTHER THAN THE SYSTEM MANAGEMENT OBJECT AND DISTRIBUTION OF ADVERTISEMENTS IS SHUT DOWN. IN THE CASE OF OPEN, THE REVERSE PROCESSING IS CARRIED OUT. |
| (F2) READY / BUSY:<br>A SESSION (RECEIVING OF INFORMATION CONTENTS, PARTICIPATION IN THE COMMODITY TRADE SESSION AND THE LIFE INSURANCE POLICY TRADE SESSION, ETC.) ENTERS A BUSY STATE AND PARTICIPATION IN ANOTHER SESSION IS PROHIBITED. |
| (F3) EFFECTIVE TIME PERIOD:<br>SET A TIME PERIOD IN WHICH AN OBJECT FUNCTIONS. WHEN THE TIME PERIOD IS PASSED, THE FUNCTION STOPS. IN THE CASE OF AN ACTIVE COMMODITY TRADE TYPE OR IN THE LIFE INSURANCE POLICY TRADE TYPE, THIS TIME PERIOD IS A SESSION OPEN TIME PERIOD (START TIME – END TIME). |
| (F4) OBJECT FUNCTION: TRADE-TYPE SERVICE INFORMATION IN CASE WHERE ACTIVE/PASSIVE AND PROVISION/OBTAINING OBJECT FUNCTION TYPES. |
| (B6) PERSONAL AUTHENTICATION DATA:<br>PERSONAL AUTHENTICATION DATA CREATED FROM A PERSONAL PORTRAIT (VOICE, VOLUME, SHAPE, WRITING, SEAL OF STAMP, VOICE PRINTING, IRIS OF AN EYE, FINGERPRINT, A MEMBRANE OF LIVING BODY, LIVING BODY INFORMATION, BLOOD VESSELS OF HAND AND OTHER PARTS OF A LIVING BODY, DNA DATA, ETC. |
| (F5) CONTENTS OF COMMODITY:<br>COMMODITY CATEGORY (DIGITAL CAMERA, AIR CONDITIONER, AUTOMOBILE, FOOD, HOUSE, CAR, CLOTH, ETC.), SERVICE CATEGORY (LANGUAGE SCHOOL, INSURANCE AND FINANCIAL SERVICE, MEDICAL SERVICE, LEGAL SERVICE, MAN POWER SERVICE, MOVING SERVICE, ENTERTAINMENT SERVICE, ADVERTISEMENT, FOSTERING SERVICE, ETC.), MANUFACTURER, MODEL NUMBER, COMMODITY PROVIDABLE AREA, DELIVERY DATE, ETC. |

FIG. 3(C)

| |
|---|
| VREQ: DESIRED PRICE: A DESIRED PROVIDING PRICE FOR A PROVISION TYPE OR A DESIRED OBTAINING PRICE FOR AN OBTAINING TYPE. |
| EXISTENCE OF DESIRED PRICE |
| VLIMIT: LIMIT PRICE: |
| EXISTENCE OF LIMIT PRICE |
| T: PARAMETER REVIEW TIME INTERVAL: FOR EXAMPLE, 24 HOUR. |
| A: PARAMETER REVIEW TIME INTERVAL VARIATION COEFFICIENT: FOR EXAMPLE, WHEN A RANGE IS SPECIFIED TO 0.5 – 0.2, THE REVIEW TIME INTERVAL RANDOMLY VARIES BETWEEN 0.5T AND 2.0T. WHEN THE VARIATION IS DESIRED TO BE ZERO, SET A RANGE OF 1.0 – 1.0. |
| M: DESIRED INCREASE OR DECREASE OF PRICE: MEANS DECREASE OF A PRICE FOR AN THE REVIEW OF A PROVIDING PRICE FOR A PROVISION TYPE OR INCREASE OF A PRICE FOR AN OBTAINING TYPE. |
| CTH: DONATION THRESHOLD VALUE |
| ATH: LARGEST BID AMOUNT VARIATION THRESHOLD VALUE PER UNIT TIME: A THRESHOLD VALUE OF A LARGEST INCREASED BID VALUE IN THE CASE OF THE REGULAR AUCTION OR A THRESHOLD VALUE OF A LEAST DECREASED BID VALUE IN THE CASE OF REVERSE AUCTION. |
| (F7) PRICE ARBITRATION ALGORITHM (CAN BE CHANGED BY A HUMAN OPERATION DURING A SESSION): |

| | | |
|---|---|---|
| AUTOMATIC | NO NEGOTIATION: AN INITIALLY-SET DESIRED PRICE IS FIRMLY MAINTAINED TO THE END. | |
| | NEGOTIATION HELD: | ACTIVE:PROVISION (REGULAR), OBTAINING REVERSE) PASSIVE:PROVISION (REVERSE), OBTAINING (REGULAR) |
| MANUAL | PRICE ADJUSTMENT BY HUMAN OPERATION | |

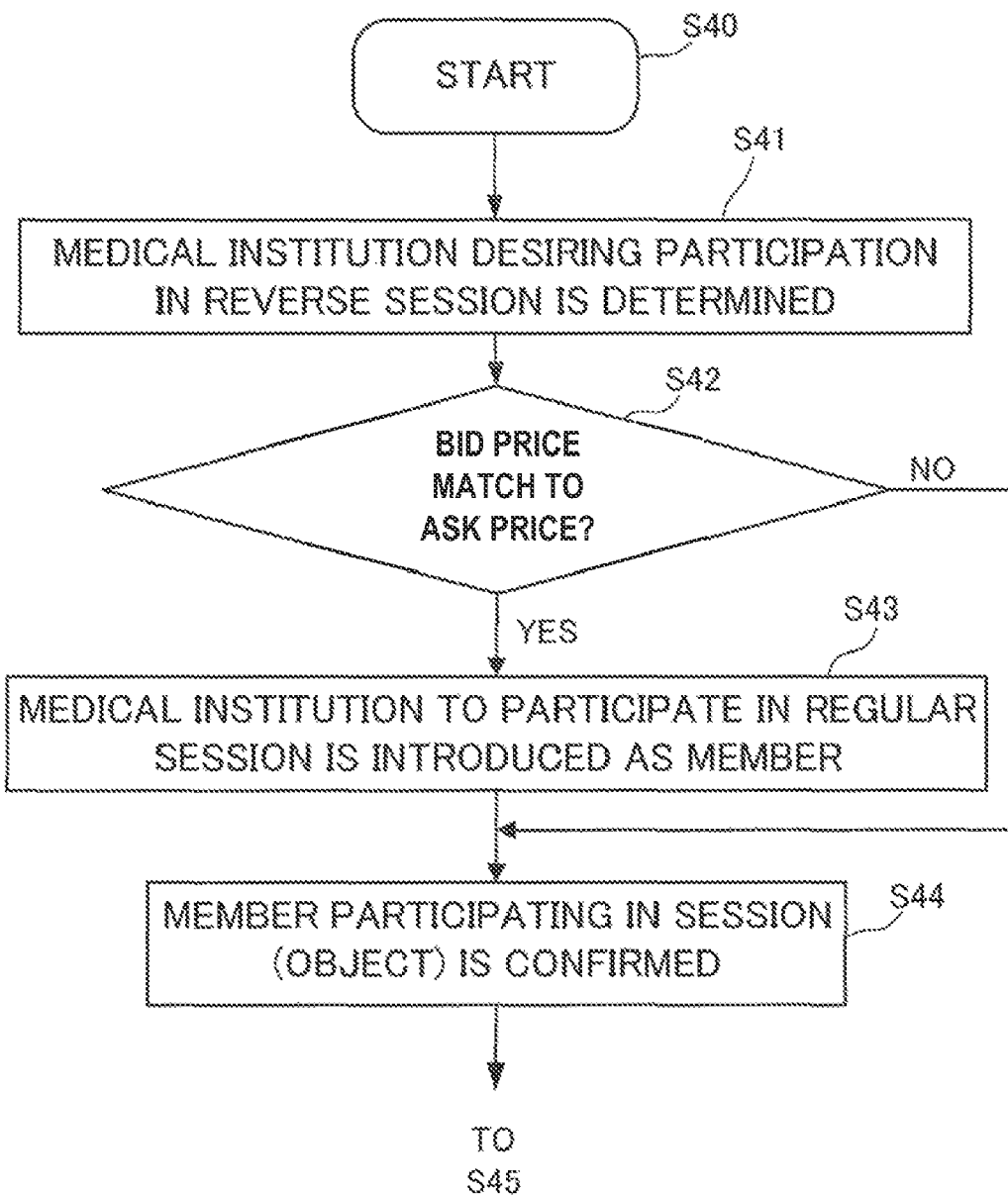

METHOD AND SYSTEM OF ADJUSTING MEDICAL COST THROUGH AUCTION

CROSS REFERENCE TO RELATED APPLICATION

The following U.S. patent application is hereby incorporated by reference in its entity as though fully and completely set forth herein: U.S. application Ser. No. 11/077,038.

BACKGROUND OF THE INVENTION

1. Field of the Invention

The present invention relates to an auction method for adjusting a reasonable price for a medical service and, more particularly, to a technique for integrating a regular auction and a reverse auction to incorporate supports of many and unspecified third parties into a means to reduce a medical service price.

2. Related Art

Usually, when a person suffers from a disease and receives a medical service at a medical institution, the person needs to pay a medical service price as a counter value for the service. In some countries in the world, an individually paid medical service price is relatively a small amount by virtue of a social insurance system, whereas, in other countries, each patient must pay almost the entire medical service price charged to the patent by a medical institution. When a medical service is given by a medical treatment stuff in a medical institution having high specialties and techniques, a medical service price charged to each patient tends to be very high, however, the patient is usually not sufficiently given an opportunity to raise an object to the appropriateness of the charged service price.

Accordingly, the patient having no scope of a negotiation on a medical service price is in a disadvantageous position in that, even though the patient hopes to receive a desired medical service, he or she has no choice but to give up receiving the service for an economic reason. Particularly in countries such as the USA, high burdens of medical costs are social problems for people except for some with large incomes and wealth, and a remarkable social phenomenon is that even a person in a serious condition cannot undergo a medical treatment just because he or she is unable to pay the cost of the medical treatment.

The problem of increasing medical costs is not a problem only for patients. In many cases, people personally contract medical insurance in preparation for the payment of high medical costs, however, an insurance company faces a problem in that the payment of high medical costs with insurance money presses the management thereof, however, raising insurance dues to be collected from insured persons results in reduction of the number of insured persons. Accordingly, the reduction of increasing medical costs is a fundamental and urgent subject.

On the other hand, taking into consideration of incentives of the beneficiary liability and the market principle under the capitalism, such behaviors as demanding a high charge from a patient as a counter value for a medical service of a high technical level or providing a medical doctor having such a high-level medical technique and therefore taking a large amount of fee should not be the targets of one-sided criticism. The matter of concern is that medical costs tend to increase greatly, resulting in people suffering from even a minor disease cannot receive medical services whereas only a limited number of wealthy people can. Further, high medical costs are not purely the result of the above market principle, but the cost of an expected medical lawsuit and the like is included in the medical costs. Accordingly, the serious problem is that the social environment, wherein some people cannot receive appropriate medical treatments due to the income gap, has actually been formed.

Accordingly, the present invention has been made to solve the above problems and an object thereof is to provide a medical treatment price adjusting method for reducing a medical treatment price to a reasonable amount so that even people with small incomes can receive appropriate medical services when they suffer from diseases whether or not they are insured, and the adjustment of the reasonable price causes no disadvantage for medical institutions and insurance companies as well as patients.

SUMMARY OF THE INVENTION

The medical treatment price adjusting method according to the present invention is a method for determining a medical treatment price for a medical service provided by a medical institution to a patient through an auction trade, wherein, regarding each medical service, the medical institution presents a predicted medical treatment price as an ask price to be charged to a patient for a medical treatment or aid, if given; the patient presents a payable amount for the medical service as a bid price; session members are determined as parties concerned in an auction trade by integrating a reverse auction trade, wherein matching of pieces of information including at least the bid price and the ask price is carried out for a medical institution to make an offer for the bid price presented by the patient, and a regular auction trade, wherein a patient makes a bid for the ask price presented by the medical institution; an auction trade is carried out by the session members; and an auction trade is ended when either of the medical institutions makes a bid for the ask price, which is less than or equal to the bid price presented by the patient, or when a predetermined auction ending time is passed.

Further, the medical treatment price adjusting method according to the present invention is a method for determining a medical treatment price for a medical service provided by a medical institution to a patient through an auction trade, wherein life insurance policy trading is opened as a condition to open an auction for the medical service, the medical treatment price adjusting method comprising, (a) in the life insurance policy trading: (i) a step of putting up an insurance policy as an insurance commodity at an auction by the patient; (ii) one insurance company or a plurality of insurance companies makes (make) a bid for the insurance policy as an insurance commodity; (iii) a step of making a successful bid by the one insurance company or one of the plurality of insurance companies which has made a bid at a highest price of not less than a specific price; or (b) in a session for said medical service: (i) a step of the patient presenting insurance money paid by the insurance company, which has made a successful bid, as a payable bid price for the medical service; (ii) a step of presenting a predicted medical treatment price as a desired ask price charged to a patient by the medical institution for a medical treatment or aid, if given; and (iii) a step of ending an auction trade of the medical service when either of the above medical institutions makes a bid for the ask price, which is less than or equal to the bid price presented by the insurance company, or when a predetermined auction ending time is passed.

The medical treatment price adjusting system according to the present invention is a system for determining a medical treatment price for a medical service provided by a medical institution to a patient through an auction trade, the medical treatment price adjusting system comprising a system server connected via a network, a patient terminal and a medical institution terminal, (a) the patient terminal transmitting a bid price for the medical service to the system server via the network; (b) the medical institution terminal transmitting a predicted medical treatment price to be charged to a patient for a medical treatment or aid, if given, to the system server via the network; (c) the system server (i) determining session members as parties concerned in an auction trade by matching pieces of information including at least the bid price and the ask price to integrate a reverse auction trade, wherein a medical institution makes a bid for a bid price presented by the patient, and a regular auction trade, wherein a patient makes a bid for an ask price presented by the medical institution; (ii) carrying out an auction trade by the session members; and (iii) ending an auction trade when either of the above medical institutions makes a bid for the ask price, which is less than or equal to the bid price presented by the patient, or a predetermined auction ending time is passed.

The medical treatment price adjusting system according to the present invention is a system for determining a medical treatment price for a medical service provided by a medical institution to a patient through an auction trade, the medical treatment price adjusting system including a subsystem wherein life insurance policy trading is opened as a condition to open an auction for the medical service and, (a) in the subsystem of the life insurance policy trading: (i) the patient transmits the life insurance policy information to a subsystem server via a network; (ii) one insurance company or a plurality of insurance companies transmits (transmit) a bid for the life insurance policy to the subsystem server via the network; (iii) the subsystem server determines to make a successful bid for the one insurance company or one of the plurality of insurance companies which has made a bid at a highest price of more than a specific price; or (b) in the system wherein the medical service auction is opened: (i) the patient transmits insurance money paid by the insurance company which has made a bid in the subsystem as a payable bid price for the medical service to the system server via the network; (ii) the medical institution transmits a predicted medical treatment price as a desired ask price to be charged to a patient for a medical treatment or aid, if given, to the system server via the network; and (iii) the system server ends the trade of the medical service when either of the above medical institutions makes a bid for the desired ask price, which is less than or equal to the bid price presented by the insurance company, or when a predetermined auction ending time is passed.

According to the method of adjusting a medical treatment price through an auction according to the present invention, a predicted medical treatment price to be charged by a medical institution after providing a medical service to a patient is presented as an ask price and, on the other hand, the patient who desires to accept the medical service presents a payable medical treatment price as a bid price, thus matching of the ask price to the desired medical charge is carried out. Accordingly, a reverse auction and a regular auction carried out using a medical treatment price as an article of trade between the medical institution and the patient can be integrated making it possible of efficiently collect members concerned in the auction trade. That is, the integrated auction according to the present invention is an auction structure between members wherein a demand for an article of trade is attempted to meet a supply of the same, and this brings about a condition where there is a high possibility of making a successful bid and an effect of markedly reducing a medical treatment price as compared to a conventional medical treatment price.

Further, the present invention is constructed to accept donations so that many and unspecified third parties other than medical institutions and patients can participate in an auction trade and therefore, a part or all of medical costs are supported by the donations to give relief to patients conventionally having difficulties in receiving medical services due to high medical costs.

Furthermore, this system of the integrated auction and the participation of the third parties in the auction results in the improvement in the business management of a medical institution and the reduction of an amount paid by an insurance company as well as the reduction of an amount paid by a patient resulting in the realization of mutual relief aid in the entire society.

BRIEF DESCRIPTION OF THE DRAWINGS

In the Drawings:

FIG. 2: A view showing an example of an input screen for information presented from a patient and a medical institution.

FIG. 3(a): A view showing an example of a data item included in a user object.

FIG. 3(b): A view showing an example of a data item included in a user object.

FIG. 3(c): A view showing an example of a data item included in a user object.

DETAILED DESCRIPTION OF THE PREFERRED EMBODIMENT

Figure 1:
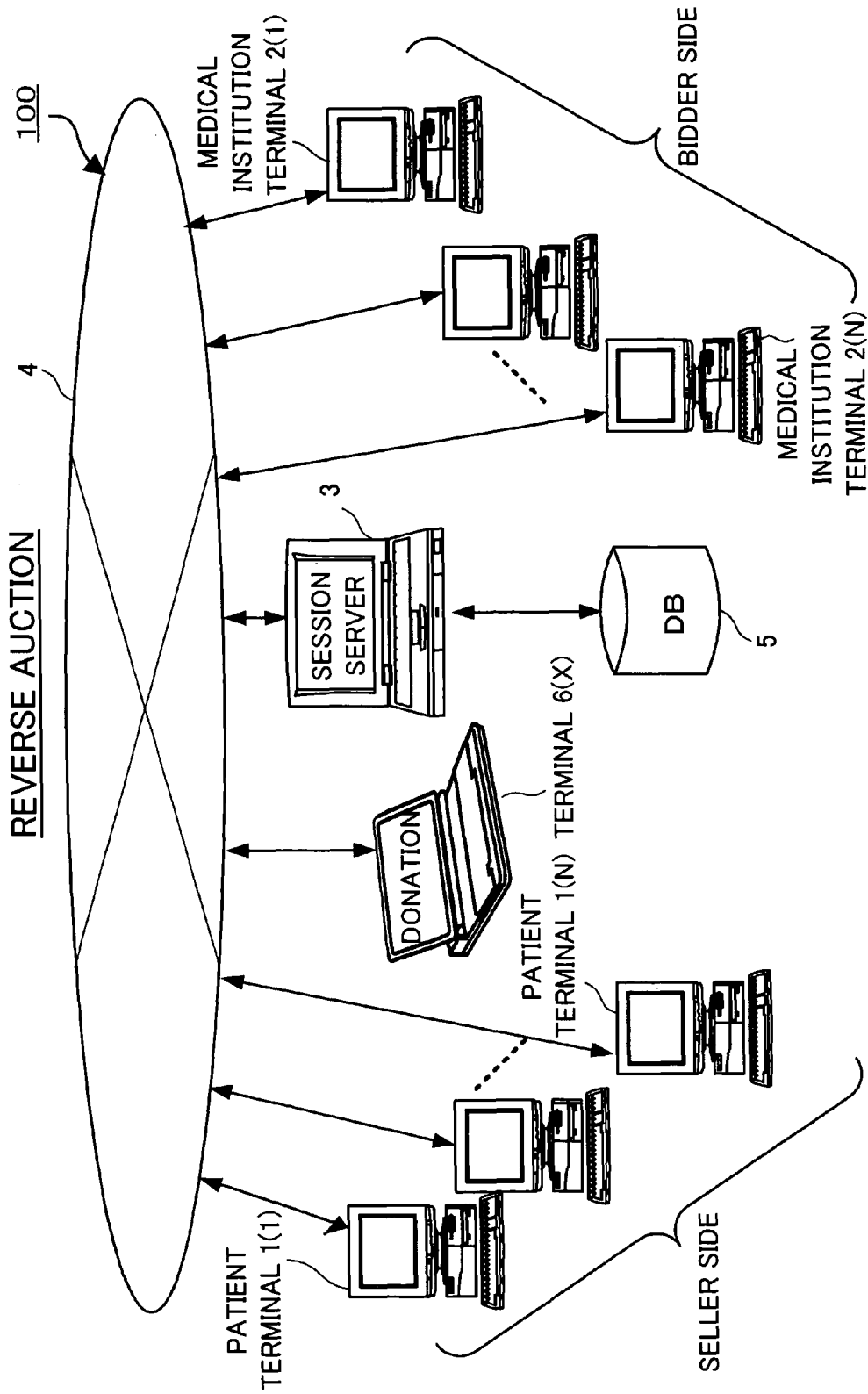
FIG. 1: A basic block diagram of a medical treatment price adjusting system of one embodiment according to the present invention.

The medical treatment price adjusting method includes a medical treatment bill which hospitals charges to patients based on hospitals and doctors to attend a medical treatment and a medical service to patients and their needs.

The system for realizing the medical treatment price adjusting method according to the present invention (hereinafter referred to as "the medical treatment price adjusting system") is used to trade a medical treatment price, that is, a counter value for a medical treatment, in the same manner as trading a substantial commodity between a medical institution and a patient as a supplier and a demander, respectively, through a communication line such as a network (hereinafter referred to as "the network"). The medical treatment price adjusting system is one type of a conventional auction system in the sense of commercial trading of a network type, and has the following features.

(1) Feature 1 (Integrated Session):

In a "regular" or "conventional" auction for a commodity, potential purchasers make a succession of increasing bids or offers for a commodity until the highest (and final) bid is accepted by the auctioneer on behalf of the seller. In a "reverse" auction, by contrast, the seller offers a commodity at successively lower prices until one of his offers is accepted by a buyer or until the prices drops so low as to force the withdrawal of the offered commodity. In a commodity trade by a conventional auction system, in addition to a usual commodity trade on a network wherein a seller presents a selling price for a commodity to be put up at an auction (hereinafter referred to as "the commodity trade-type regular session or the regular session"), there is a commodity trade wherein a buyer presents a purchase price (hereinafter referred to as "the commodity trade-type reverse session or the reverse session"). These sessions are each carried out in an independent form. Therefore, the sessions processed in the system are not directly linked with each other and items put up at both sessions are not automatically announced to participants. In other words, since the highest bid prices of commodities do not affect each other, when the highest bid prices are attempted to be determined in summarized trades in the regular session and the reverse session, the intervention of a human operation is inevitable. Consequently, the network auction cannot flexibly and quickly meet with needs of a seller and a purchaser.

In contrast, the basis of the medical treatment price adjusting system of the present embodiment is an auction wherein a price for a medical treatment is adjusted in a system wherein the commodity trade-type regular session and the commodity trade-type reverse session are integrated. The auction of the regular session is a system of making a bid with a medical institution as a seller and a patient as a buyer. A specific example is that, respective patients make bids at 25,000 dollars and 30,000 dollars for a medical service announced as "an operation for gastric cancer will be performed at a minimum price of 20,000 dollars" and a patient who proposes the highest bid makes a successful bid for the service. In contrast, in the auction of the reverse session, the patient as a buyer presents a medical treatment ask price, then medical institutions as sellers make bids for an acceptable medical treatment price for the operation and the patient accepts the bid of a medical institution which has made the lowest bid for the medical treatment price for the operation. For example, when the patient proposes "will any hospital accept a request for an operation for a gastric cancer at the price of not more than 30,000 dollars?" then respective medical institutions make bids for the proposal at 28,000 dollars and 25,000 dollars, the medical institution which has presented a low price of 25,000 dollars makes a successful bid.

According to the present invention, when the regular session auction is carried out, a matching search of a patient and a medical institution is carried out by using a medical treatment price for the contents of a medical service (for example, an upper limit of a payable medical treatment price presented by a patient) as a keyword and, as a result, a patient who desires to play a part in the reverse session auction and to receive a medical service is treated as a participant of the auction. Then, when the reverse session auction is performed, a matching search is carried out in the same manner using, for example, a medical treatment price (for example, a lower limit of a price for providing a medical service presented by a medical institution) as a keyword, thereby treating a medical institution which desires to play a part in the regular session auction as a participant of the auction. The present invention is characterized in that the gap between different sessions is thus eliminated to integrate the regular session and the reverse session, and to realize an auction as an integrated auction. In particular, in determination of a medical treatment price traded mainly at the reverse session auction, a patient presents an upper limit of a payable medical treatment price and a medical institution having presented a lower limit of a medical treatment price makes a bid, and therefore, a plurality of medical institutions compete with each other at an auction for the lower limit of a medical treatment price so that an effect of reducing a medical treatment price can be expected.

(2) Feature 2 (Donation Accepting Mechanism):

A party concerned in a commodity trade by the conventional auction system is a party directly concerned in sale and purchase of a commodity to be traded except for a deputy of the party concerned, and a case where a person who is not concerned in the commodity trade at all plays a part in the conventional auction system is not assumed.

In contrast, the medical treatment price adjusting system of the present embodiment has a mechanism to allow many and unspecified third parties other than medical institutions and patients to participate in a medical treatment price trade. Specifically, the third parties are concerned in the auction system by making donations for a medical treatment price to be paid by the patient. Even if an amount of a donation from one person is small, the total amount of donations from hundreds of thousands to millions of people is very large. A third party being a member, who makes a donation of even a small amount through the medical treatment price adjusting system, actively makes a donation since it is possible that the third party is helped by other members when suffering from a disease. Also, these donations are advantageous for a patient in that the donations equally reduce medical treatment prices asked by a plurality of medical institutions as well as greatly reducing self expenses of insurance companies. Furthermore, the donations also contribute for medical institutions to stabilize the business management thereof by obtaining patients wherefrom medical treatment prices can surely be collected.

Preferred embodiments of the present invention will be described in detail hereunder with reference to the accompanying drawings.

FIG. 1 is a basic block diagram of a medical treatment price adjusting system 100. In the medical treatment price adjusting system 100, a medical institution and a patient as a supplier and a demander, respectively, trade a medical treatment price, that is, a counter value for a medical treatment therebetween in the same manner as trading a substantial commodity through a network 4. As shown in FIG. 1, each patient uses one of patient terminals 1(1), - - - , 1(n) (hereinafter represented by "the patient terminal 1(x)") connected to the network 4 as an input means to enter desired "contents of a medical service (for example, an operation for a gastric cancer)", "a rate of a self expense (for example, 20%)" in a medical treatment price charged by a medical institution, "an upper limit of a payable amount (for example, 20,000 dollars)" of a medical treatment price estimated on the basis of an insurance money received from an insurance company" and the like. On the other hand, the medical institution uses one of medical institution terminals 2(1), - - - , 2(n) (hereinafter represented by "the medical institution terminal 2(x)") connected to the network 4 as an input means to enter "a lower limit of a medical treatment price (for example, 28,000 dollars)" as a counter value for a medical service desired to be received by the patient which is estimated from past similar medical treatment prices.

In addition, the above-described information to be entered by the patient and the medical institution to the medical treatment price adjusting system 100 is only a part of the information for making it easy to understand the present invention, however, the information to be entered is not limited to the above information. In order to determine a medical treatment price agreeable between both the patient and the medical institute by using the medical treatment price adjusting system 100, pieces of detailed information about many other patients and med/ical institutions are needed. The specific information is described in an example of an information input screen shown in FIG. 2.

A session server 3 stores the information entered from the patient terminal 1($x$) and the medical institution terminal 2($x$) as user objects. FIG. 3 shows an example of data items included in the user objects. In particular, there is provided "(f4) object function" as one function information item, and this information is used to distinguish whether each user object is a passive object or an active object from the functional characteristics of the each user object. Furthermore, information about a purpose of using the object such as providing or obtaining (a medical treatment) is added to determine a type whereto the user object belongs from the following four types: (i) active/providing, (ii) active/obtaining, (iii) passive/providing and (iv) passive/obtaining.

In the case of the regular session auction, since the medical institution (a seller side) initiates the session (the medical institution is therefore active) presents the provision of a service to the patient (a buyer side), a user object created from information entered by the medical institution is an "active/providing" type. Accordingly, since some patient can make a successful bid for the medical service, a user object created from information entered by the patient is a "passive/providing" type object. Further, since the patient presents a desired medical treatment price at the reverse session auction to initiate the session, a user object created from information entered by the patient is an "active/obtaining" type and a user object created from information entered by the medical institution is a "passive/providing" type.

As described above, in order to effectively reduce a medical treatment price by the present invention, it is appropriate to perform an auction on the basis of the reverse session auction wherein a patient can take initiative more easily than in the regular session. Accordingly, the opening of the reverse session will be described as an example, however, note that the significance of the present invention is not lost even when the regular session auction is opened.

When information required of the patient to create an active/obtaining type object including "contents of a medical service", "a self expense rate", "an upper limit of a payable amount (for example, 20,000 dollars") and other information shown in FIG. 2 are entered via the patient terminal 1($x$), these pieces of information are set in data items of user objects shown in FIG. 3. In addition, it is desirable that entry by each patient can be simplified by distinguishing the entry by the patient made at the reverse session auction and automatically specifying the adjustment of "(f4) object function" to an item to the "active/obtaining" type. However, the patient may specify the item by himself or herself.

The basic procedures of the reverse session auction will be described hereunder.

Procedure 1: The session server 3 issues a session start notification message to a medical institution making a bid at the reverse session auction to notify the start of a reverse session. The medical institution having received this notification can grasp the contents of the session through the screen of the medical institution terminal 2($x$). The contents of the session include, for example, a profile of a patient, contents of a medical service, a desired medical treatment price and a session start date. These contents are also outputted onto a screen of an optional terminal connected to a session server via the network 4 so that third parties other than bidders can also refer to the contents.

Procedure 2: The session server 3 further detects a medical institution which has opened a reverse session auction by matching search and issues a session start notification message. Then, the session server 3 starts a reverse session auction when a session start date has come. The medical institution having received the start notification is allowed to participate in the auction without making a final bid and is free to retreat from the auction.

Procedure 3: The patient as an initiator or the medical institution as a bidder can chose an automatic or a manual (a human operation of) auction carried out under the management of the session server 3 until a successful bid is made. In the case where a successful bid is made automatically, a medical treatment price is determined using predetermined parameters ("(f6) parameters in automatic successful bid" shown in FIG. 3) in accordance with an algorithm which will be described later.

<Automatic Determination Algorithm for Medical Treatment Price>

Figure 4B:
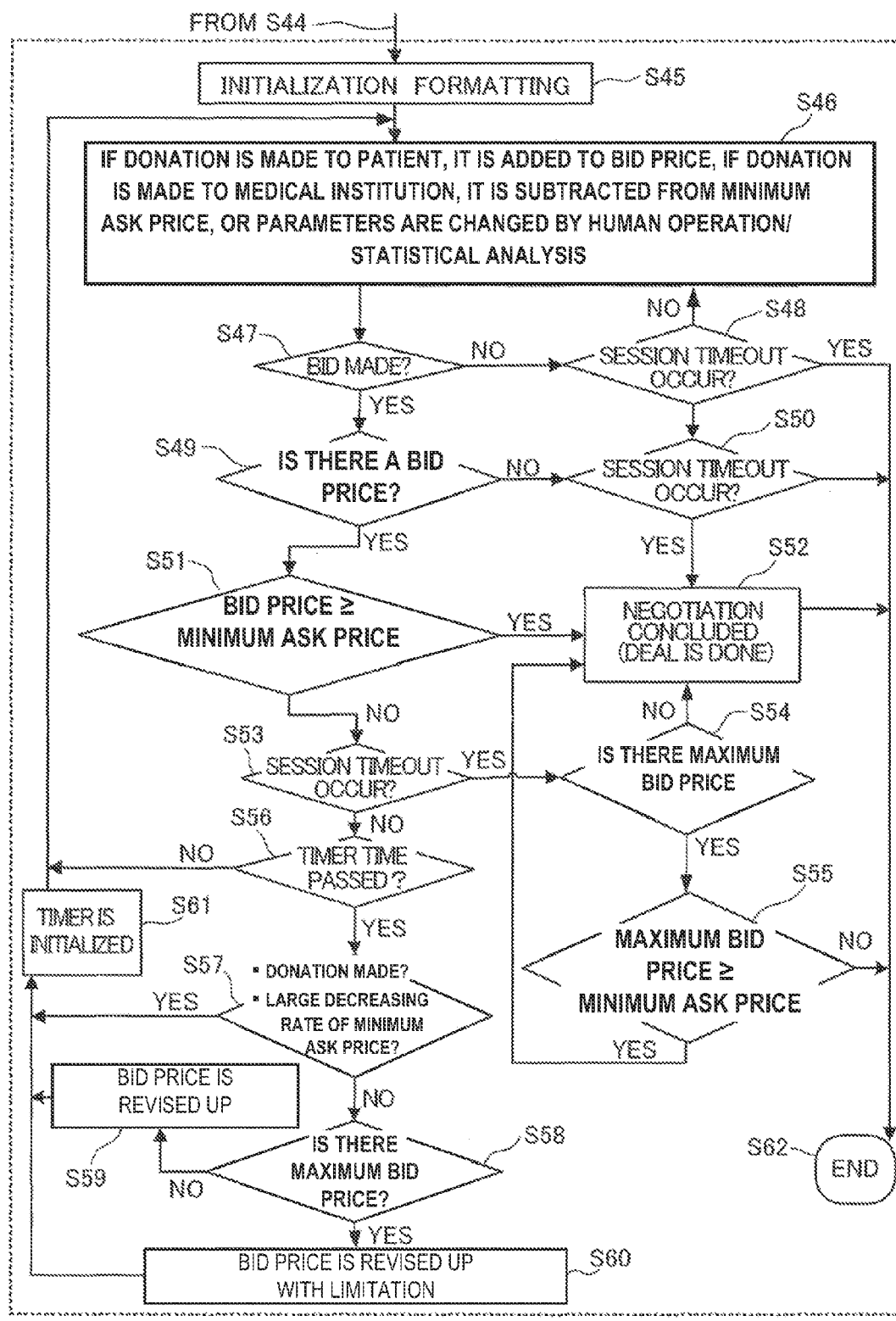
FIG. 4: A flowchart showing an algorithm for automatically determining a medical treatment price at a reverse session auction as a main form.

FIG. 4 shows an example of a detailed algorithm for automatic determination of a medical treatment price at the reverse session auction as a main form.

First, the session server 3 determines session members before the start of the reverse session in steps S41 to 44.

The session server 3 searches for a medical institution which desires to participate in the reverse session auction (step S41). For this purpose, a passive/providing type object can be searched in the registered user objects. The reason is that, the information entered by the medical institution via the medical institution terminal 2($x$) is set as a user object of a passive/providing type in the reverse session auction as described above. The session server 3 further introduces the medical institution, which desires to participate in the regular session auction (i.e., the active/providing type user object), into the reverse session as a member thereof. At this time, the number of search targets is narrowed to a specific number (step S42). For example, when the patient presents 30,000 dollars as an upper limit of a payable amount for an operation for a gastric cancer, it is scarcely possible that the medical institution which presents a lower limit of a medical treatment price of 40,000 dollars makes a successful bid, and it is therefore almost meaningless to allow this medical institute to participate in the session as a member. Accordingly, the session server 3 picks up only medical institutions which possibly accept the demand of the patient by the matching search using AND conditions including "an operation for gastric cancer" and "a lower limit of a medical treatment price of not more than 30,000 dollars" as matching keywords (step S43). The user objects of the reverse session and the regular session thus selected are set as session members in the present invention.

Next, donation acceptance processing required in processing in steps S45 and subsequent steps will be described.

The information entered by the patient via the patient terminal 1($x$) includes a maximum amount payable taking into consideration of a self expense rate to a medical treatment price and insurance money received from an insurance company. On the other hand, the information entered by the medical institution via the medical institution terminal 2($x$) includes a minimum medical cost estimated from past results of medical treatments. When there is a great difference between these amounts, there is little chance of finally concluding a trade so that a deal is done (making a successful bid) at the reverse session auction according to the present invention. Accordingly, the donation acceptance processing functions to conclude the trade so that the deal is done at the reverse session auction by accepting donations from many and unspecified third parties, which are not parties directly concerned in the trade in the medical treatment price adjusting system 100 (session members) but which are observing the session through the network 4, and to reflect the donations to the essential reduction of the amount presented by the medical institution.

As described above, the information related to the trade in the session is disclosed on optional terminals 6($x$) (only one representative terminal is shown in FIG. 1) connected to the session server 3 via the network 4 in addition to the medical institution terminal 2($x$) and the patient terminal 1($x$) so that the third parties other than the bidders can make donations upon referring to the information. In addition, the information referable by the third parties may be controlled by the management of the session server 3 for the purpose of protection of privacy so that the predetermined information can be concealed or access thereto can be restricted.

(1) Direct Donation from Third Party:

A predetermined amount (for example, one dollar) may be reflected in the amount bid by the patient or asked by the medical institution each time any one of the above-described third parties clicks a donation button provided on a screen for an open session displayed on the optional terminals 6($x$) connected to the session server 3. Further, an optional amount specified by the third party may be sent as a donation. For example, when a donation of 1,000 dollars is made to a patient who presents a maximum amount payable of 30,000 dollars at the reverse session auction, the patient's maximum amount payable changed to 31,000 dollars or, when a donation of 10,000 dollars is made to the medical institution which presents a minimum medical treatment price of 40,000 dollars, the minimum medical treatment price is changed to 30,000 dollars. Changes in the maximum amount payable and the minimum medical treatment price are preferably reflected in real time mode at specific time intervals.

The third party having made a donation settles the donation sum through predetermined procedures. For example, the session server 3 draws the amount corresponding to the donation to be transferred to a bank account of a party to which the donation is made from the third party's bank account. When the third party has experienced a trade at the session auction according to the present invention, a unique ID number to be added to each third party can be specified at the time of making a donation to specify the third party's bank account from the information of this ID number. On the other hand, when the third party makes a donation for the first time, the third party may be required to enter information for identifying the third party's bank account in addition to personal information, send bank account information from an optional terminal 6 or send the bank account information by an optional means after expressing an intention to make the donation. In addition, the third party capable of making a donation may be limited to a manager of the session server, that is, a one who has passed an admission examination given in advance by a person in a managing facility of the medical treatment price adjusting system.

Results of donations made by donators are stored in "(b8) donation history" included in data items of user objects shown in FIG. 3, and disclosed to a third party if necessary. The purpose of the above processing is to inspire the motivation of making donations by a third party knowing the detailed results of respective donations made by the patient and the medical institution during a session. The donation history is preferably disclosed on the terminal 6($x$) so that the total donated amount and the total amount of received donations can be known.

(2) Indirect Donation from Third Party:

This is a case where the third party does not participate in the session auction on the basis of an intention to make a donation of a predetermined amount for a medical treatment price, but a specific behavior of the third party indirectly contributes to the reduction of the medical treatment price. The specific behavior of the third party is, for example, a number-selection type lottery whose prize is finally won when a plurality of pieces of winning factor information (A and B) are matched (hereinafter referred to as "the lottery"). When all or a part of the proceeds of such a lottery are transferred to the bank account for donations, the session server 3 shares the proceeds among patients and medical institutions desiring to carry out a session trade in the medical treatment price adjusting system 100, evenly or in accordance with balances in patients' bank accounts. Further, various distribution methods are included, for example, each patient may directly refer to the contribution history described in (1) above to determine a share of a donation to be received by himself or herself on the basis of amounts of donations which have been made by the patient to other persons.

A person who buys a chance in the lottery expects to receive a prize of an appropriate amount when he or she wins the prize. However, when the lottery number and the winning number specified by the purchaser are attempted to be sent or received via a network or the like, the data may be falsified by an illegal information operation of a person of a malicious mind. Accordingly, the medical treatment price adjusting system 100 according to the present invention makes the lottery be held fairly without a winning number being determined arbitrarily by a person of a malicious mind. In the case of this embodiment, the winning factor information A is, for example, time information to be added to an end time of a session (e.g., +4 hr). On the other hand, the winning factor information B is preferably information which can be uniquely specified in one session and set on the basis of information disclosed to the general public. The disclosed information includes, for example, average stock prices in the New York, London and Tokyo stock markets at the end of a session (in case of a closed market, a closing price is applied).

The session server 3 encodes the winning factor information A and distributes the winning factor information A to purchasers of chances in the lottery via the network before the time at which the winning number is determined. A participant of the lottery selects a predetermined number of (e.g., five) optional natural numbers from natural numbers within a predetermined range (e.g., 0 to 9) and buys the selected numbers as one lottery ticket during the session, and a winning order is determined depending on the number of winning natural numbers. The withdrawal of the purchase price for a chance in the lottery can be settled in the same manner as the settlement of a direct donation by a third party. The winning numbers are determined, for example, as follows.

The session server 3 adds the winning factor information A at the end time of the object session, and specifies as the winning factor information B a plurality of numbers obtained from converting average stock prices of the aforementioned plurality of stock markets at the end time (or a succeeding time closest to end time) into dollars at the exchange rate at the end time. A specific example is that, assuming that a Nikkei Stock Average of the Tokyo stock market converted into dollars at the time obtained from adding 4 to the end time of a session is $154.04, an average stock price of the London stock market (upper 100 companies) converted into dollars is $11,000.54 and an average stock price of the New York stock market (conversion into dollars is not necessary) is $1,200.31, these values are each multiplied by 100, upper and lower digits are inverted, upper 5 digits of the numbers are added, and upper five digits of the result of the addition is determined to be the winning number.

A specific example is given below.

There can be obtained 40,541+45,000+12,003=97,544 from summing up the following three values:

Tokyo: 145.04×100=14,504→4,0541,

London:

11,000.54×100=1,100,054→4,000,011→45,000, and

New York: 1,200.31×100=1,120,031→12,003.

Accordingly, the numerals 9, 7, 5, 4 and 4 are determined to be winning numbers and a person who hits the five numbers wins the first prize. In addition, the digit places are inverted to prevent the winning numbers from being affected greatly by minute changes in stock prices. If the digit places are not inverted, anyone can easily estimate some of the five numbers by observing changes in stock prices and the lottery is not substantially won on the basis of pure guessing of the five numbers.

In addition, described above is only one example and, needless to say, a case where various corrections are made is also included. For example, one value "97,544" taking the digit places into consideration may be winning numbers instead of regarding that each of the five numbers is independent of the other numbers.

The session server 3 distributes key information to decode the code and session ending time information to the purchasers of chances in the lottery when the winning number determination time is passed. The purchasers of chances in the lottery know that the value of the winning factor information A is "+4" by decoding the winning factor information distributed in advance by using the key information. The determination algorithm of the winning numbers is preferably announced to the participants of the lottery in advance or distributed together with the code key.

By the above procedures, the purchasers of the lottery can verify that the winning numbers are calculated from the average stock prices and the exchange rate at the time the session ending time information and the winning factor information A are added. Further, according to the winning number determining method of the present embodiment, it is possible to judge whether the winning numbers are determined in a fair manner.

Furthermore, the winning numbers may be determined in real time mode with the winning number determination time. Specifically, average stock price information and exchange rate information of the Tokyo, New York and London stock markets are stored in a database 5 at a predetermined time interval (e.g., 1 min) so that the patient, the medical institution and the purchasers of chances in the lottery can check the momentarily changing average stock price and exchange rate information at the predetermined time interval on respective terminals. This information is preferably displayed visually as a graph so that the contents thereof can be known easily. The winning number is determined also by searching in this database 5 so that the winning numbers are determined substantially in real time mode by specifying the winning number determination time, for example, after few minutes from the end of the session. This method is effective to inspire the sense of presence in processing up to the determination of the winning number and an intention to buy a chance in the lottery.

Figure 7:
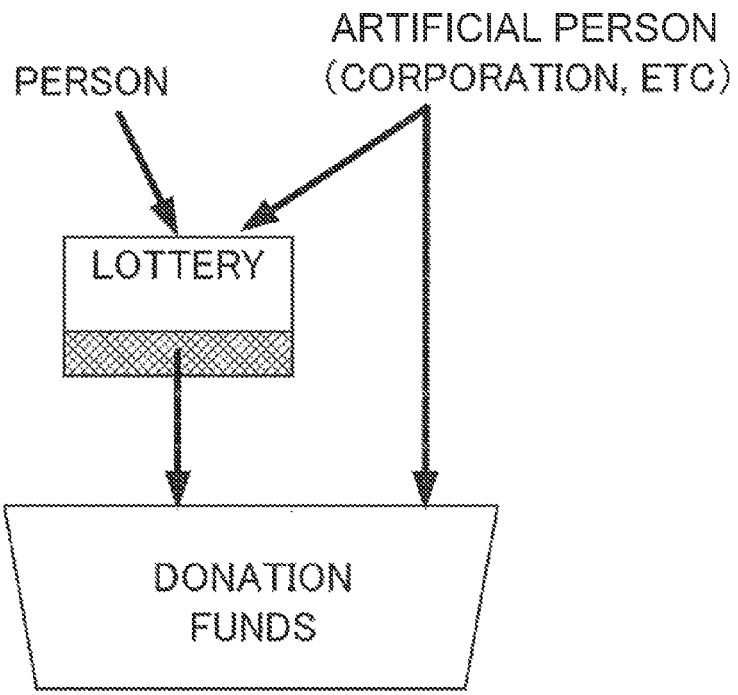
FIG. 7: A schematic diagram showing a flow of a donation.

(3) Donation from Third Party:

The medical treatment price adjusting system 100 of the present embodiment also accepts donations from parties other than individual (that is, natural) persons. FIG. 7 is a schematic diagram showing a flow of a donation. For example, a part of an interest or a share in addition to a commodity traded by a bank, an association or a foundation, are collected to form a deposit to a financial institution (hereinafter referred to as "the M bank"), and a donation is sent from the M bank to the medical treatment price adjusting system 100, and then the session server 3 transfers the donation from the account of the M bank to the patient's bank account. In addition, the amount of the donation by the M bank is changed in accordance with the deposit balance or the result of managing the collected deposits, and the donation is shared in accordance with the result of past donations distributed evenly to patients.

Here, returning to the flowchart shown in FIG. 4, the session server 3 transitions to the start of a real reverse session after confirming session members (i.e., user objects) to participate in the reverse session (step S44).

First, a timer and various parameters, which will be described later, are initially set (step S45). The timer is provided to determine whether a donation is made and, if made, to determine and carry out processing reflecting an amount corresponding to the donation to a patient's bid price for a medical treatment or the above both institutions, and moreover, ending of a session and the like at a predetermined time interval ($T*\alpha$). Here, T and $\alpha$ denote a parameter reviewing time interval of the user object item shown in FIG. 3 and a variation coefficient of the parameter reviewing time interval ($\alpha$), respectively. Further, "an ask price", which is ask price presented by a medical institution, for which a patient makes a successful bid at not less than the ask price and "a bid price", which is an amount bid by a patient, which is accepted by a medical institution when the ask a price is not more than the bid price, as well as a specific threshold value may be set as various parameters. Specific examples thereof include, "a minimum ask price", which is a threshold price, that is, the lowest price at which a successful bid can be made at the end of a session, and "a maximum bid price", that is, the highest price at which a successful bid can be made at the end of a session. These parameters can also be changed at a predetermined time interval ($T*\alpha$).

The session server 3 executes session processing in accordance with the presence of the bid price and the maximum bid price.

(i) Case where a bid is made (Yes in step S47):

When a patient specifies a bid price (Yes in step S49) and the minimum ask price of a medical institution is less than or equal to the bid price (Yes in step S51), an agreement and a deal is made between the patient and the medical institution, then the session is ended before a predetermined session ending time (step S52). On the other hand, even if the medical institution's minimum ask price is larger than a patient's bid price (No in step S51), when the minimum ask price is not larger than the maximum bid price, the session is ended upon conclusion of a negotiation or, when a donation is made (Yes in step S57), the addition of the amount corresponding to the donation to the bid price or the subtraction of the same from the minimum ask price are repeated until the session ends (step S46). Further, when a reduction rate of the minimum ask price per unit time during a session is large, step S57 also returns to step S46 and takes the same effect as that of the addition and subtraction of the amount corresponding to the donation. That is, in the case where the reduction rate of the minimum ask price per unit time is large, the medical institution lowers the presented ask price during the session, and this means that the medical institution has a strong intention of making a successful bid (i.e., meeting the maximum bid price) at the auction and desires to positively provide a medical service. Accordingly, the session server 3 needs to make a negotiation be concluded easily so that a deal is done in the next session. For this purpose, the bid price or the minimum ask price is adjusted in step S46.

Furthermore, when a donation is not made or the reduction rate of the minimum ask price per unit time is too small and the medical institution therefore has no intention to positively make a successful bid (No in step S57), the session server 3 does not intentionally lower the bid price, but makes a correction by adding a predetermined increase to the current bid price. However, when the patient specifies a maximum bid price, the session server 3 adjusts the increase of the bid price to not more than the maximum thereof (step S60), or when the patient does not specify a maximum bid price, the session server 3 adjusts the bid price by adding the predetermined increase to the bid price in the next session (step S59). Thereafter, the session server 3 repeats this series of processing at the predetermined time interval until the session ending time comes.

(ii) Case where no bid is made (No in step S47):

The session server 3 repeats the addition of the donation to the bid price or the subtraction of the same from the minimum ask price (steps S48 and S46), and ends the session when a session timeout occurs (Yes in step S48) assuming that the negotiation has not been concluded and the deal is therefore not done (step S62).

Note that the processing for increasing the bid price at the predetermined time interval in steps S59 and S60 above appropriately incorporates the relationship between the demand and the supply in the trade. That is, when a bid price is raised or a minimum ask price is lowered as a result of collecting donations, there is a high possibility of making a successful bid at an amount of not less than a current bid price and therefore, the bid price need not to be intentionally changed. On the other hand, when donations cannot be collected, it is difficult to make a successful bid at the current bid price and therefore, the bid price is revised up by a predetermined increase amount within the range of the maximum bid price to bring the bid price close to the minimum ask price.

In addition, instead of automatically carrying out the above session processing under the management of the session server 3, the session manager may intervene in the observation of a trade by the patient and the medical institution by changing the minimum ask price (step S46). Some patient has no intention to purchase a medical service by daring to lower the bid price for the medical treatment or, on the other hand, some patient hopes to receive a medical service from the medical institution at any treatment price. The session members thus have various levels of intentions to make a successful bid. At the auction of the present embodiment, an intention to make a successful bid of a party concerned in the trade is reflected in a change in the bid price for the medical treatment or the minimum ask price, regardless of whether the session processing is carried out automatically or with human intervention.

Further, an objective judgment of a third party on the appropriateness of the bid price for the medical treatment and the minimum ask price may be incorporated to the aforementioned automatic determination algorithm. A specific example is that, the third party observing the session enters "appropriate" or "inappropriate" to vote whether an adjusted medical treatment price is appropriate or inappropriate, by pressing a button on the optional terminal 6(x), or sends a questionnaire created by text entry to the session server 3. The session server 3 may objectively evaluate the above information by statistical analysis to raise or lower the current bid price.

Figure 5:
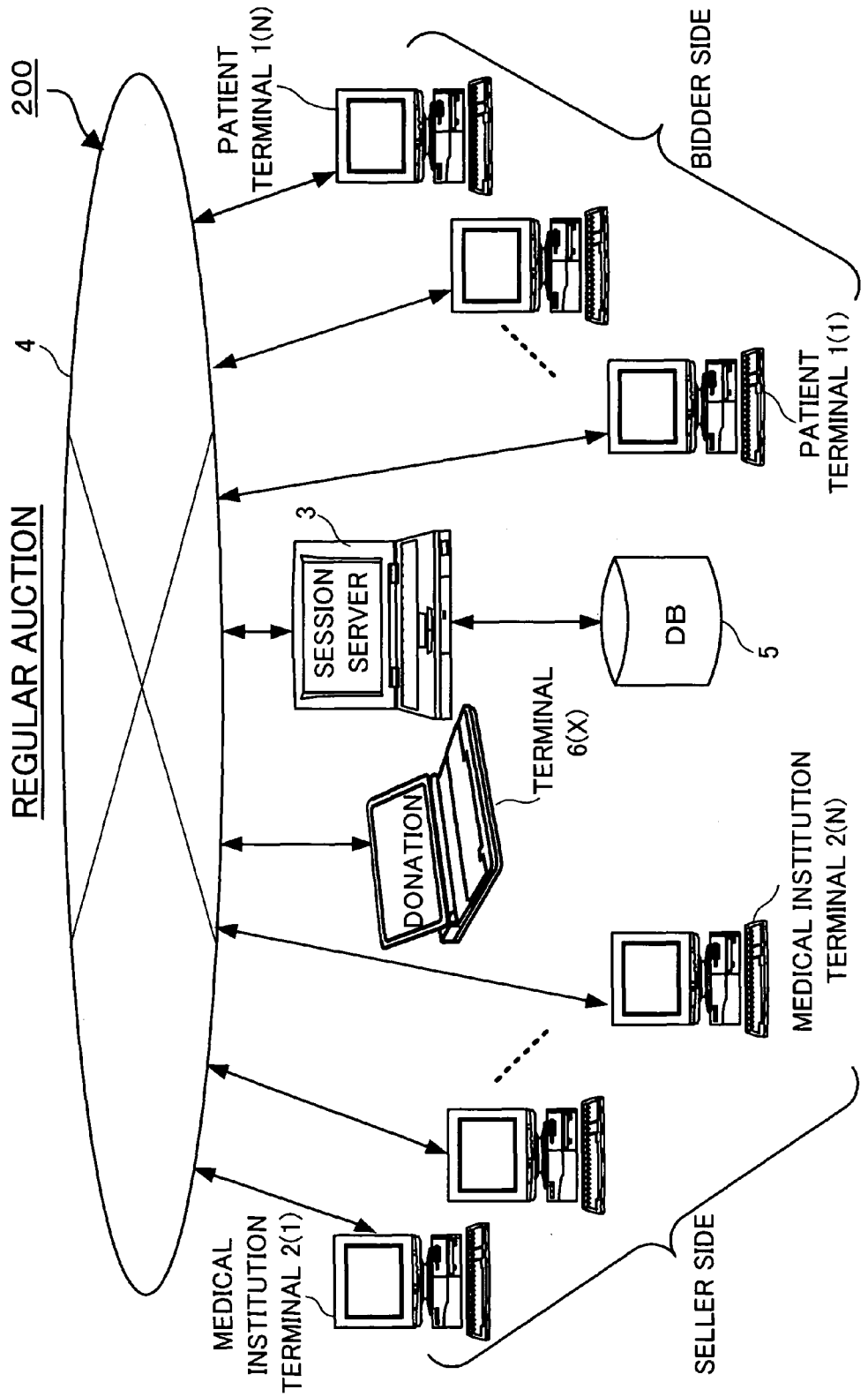
FIG. 5: A basic block diagram of a medical treatment price adjusting system of one embodiment according to the present invention.
Figure 6A:
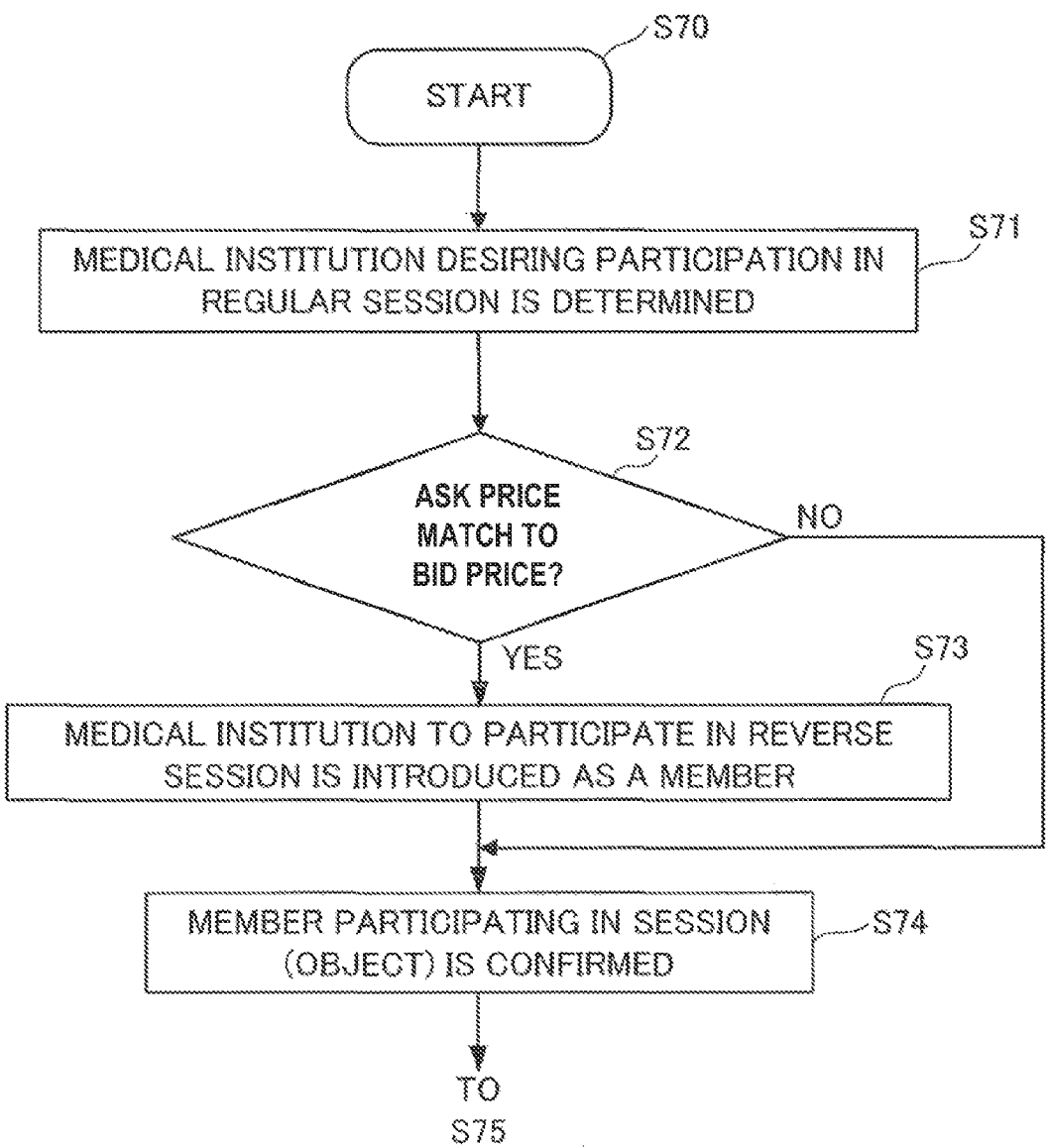
FIG. 6: A flowchart showing an algorithm for automatically determining a medical treatment price at a regular session auction as a main form.
Figure 6B:
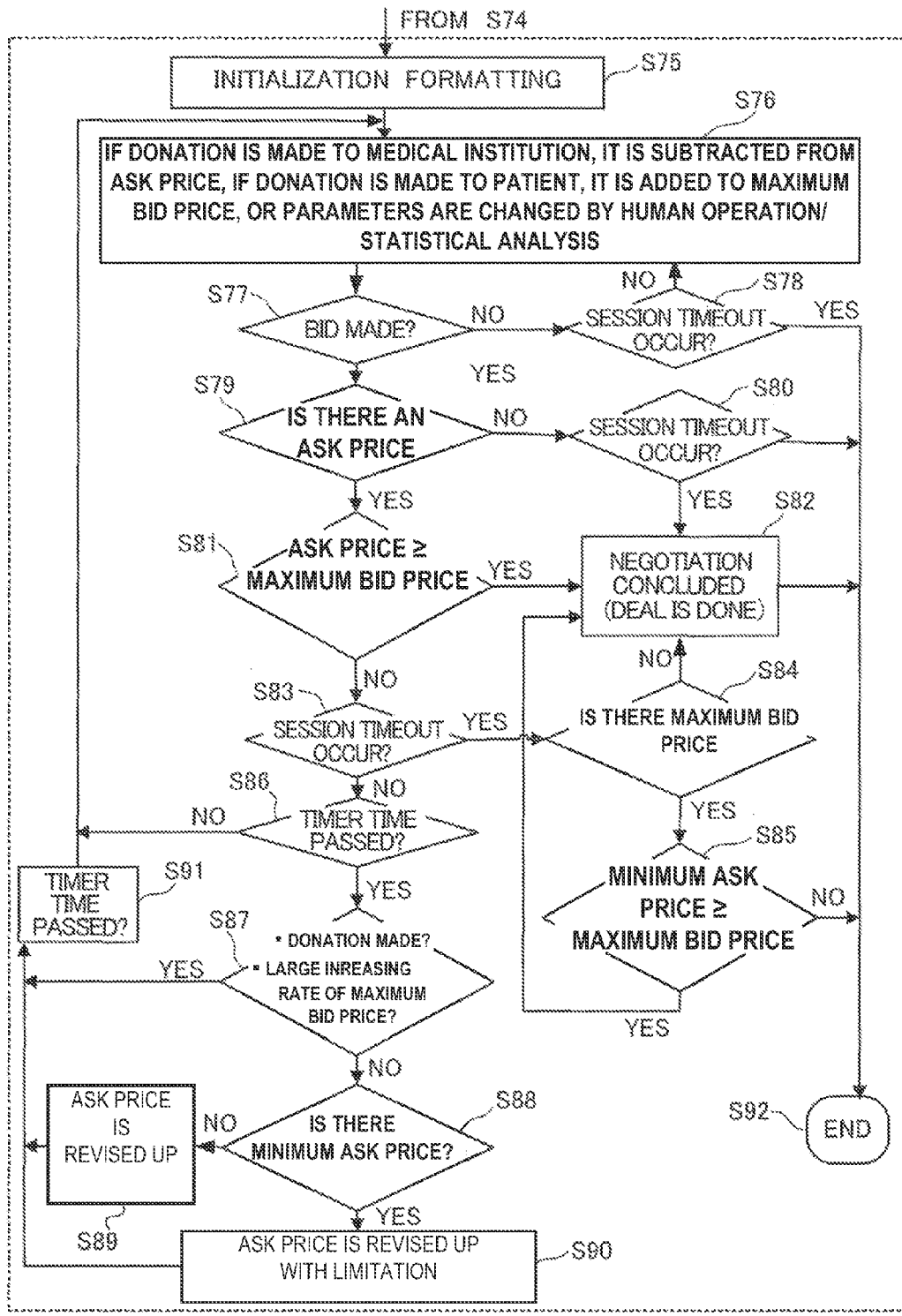

The above-described automatic determination algorithm for a medical treatment price is applied when a medical service presented by the medical institution is determined in the reverse session at the initiative of the patient. In contrast, there is an algorithm for determining a medical treatment price in the regular session at the initiative of the medical institution, that is, the asking side in the reverse session. FIG. 5 is a block showing the structure of the algorithm for a medical treatment price adjusting system of one embodiment according to the present invention. FIG. 6 is a flowchart showing an algorithm for automatically determining a medical treatment price at the regular session. The regular session is a form wherein the medical institution puts up a medical service at a network auction and each patient makes a bid for the medical service. The regular session auction can be carried out as a basic form when a conscientious medical institution provides a medical service at a low price.

The integration of the reverse session with the regular session for supplementation is similar to the case where the regular session is integrated with the reverse session for supplementation. The operation procedures of the regular session are basically the same as those of the reverse session. In order to integrate both sessions by eliminating the difference therebetween, the session server picks up a patient who makes a bid at the regular session auction (i.e., the passive/obtaining type user object), together with introducing a patient, who makes a bid at the reverse session auction (i.e., the active/obtaining type user object), as members of the regular auction. At this time, the session server narrows down the number of target patients to a specific number in the same manner as in the reverse session.

Further, in the case of the regular session, since the relationship between the seller and the bidder is exactly opposite to that in the reverse session, the bid price is replaced by the ask price, the minimum ask price is replaced by the maximum bid price, the minimum ask price is replaced by the maximum bid price, and the maximum bid price is replaced by the minimum ask price, respectively. In addition, the maximum bid price represents the maximum of all bid prices and the minimum ask price represents the minimum amount at which a medical institution can carry out a medical service.

In addition, when either session is carried out as a base, the medical institution actually diagnoses the patient and the medical institution and the patient reconsider each other's information, then the patient finally decides whether to receive a medical service and the medical institution finally decides whether to give a medical treatment. That is, the medical institution can cancel a successful bid upon knowing that it is difficult to collect a medical treatment price as a result of the actual diagnosis. On the other hand, the medical institution is obliged to provide a medical service at the price corresponding to the successfully-bid medical treatment price upon deciding that the medical treatment price is collectable. Further, the session may be constructed so that, when the medical institution participating in the session adjusts a medical treatment price to include a surcharge for an expected problem with the patient in addition to an actual, necessary medical treatment price and no problem however occurs after the medical service is actually given, the problem surcharge is returned to the patient. The present invention can thus provides the system and the technique taking into consideration actual circumstances in the field of actual medical treatment.

According to the medical treatment price adjusting system 100 or 200 of the present embodiment, since a seller and a buyer whose demands are optimally matched to each other can be found quickly by virtue of the integration of both sessions, the time required to determine a medical treatment price can be shortened and, at the same time, the medical treatment price can be reduced to a rational and reasonable amount. That is, since the mechanism of adjusting a medical treatment price under the market principle is adopted, general citizens can accept medical treatments for diseases at optimum medical treatment prices so that an unreasonable increase in medical treatment prices can be prevented.

<Application Example: Integration of Medical Treatment Price Adjusting System 100 or 200 and Life Insurance Policy Trading>

Figure 8:
FIG. 8: A view showing an auction in a form of integrating a session trade of a medical service and a life insurance policy trading session.

Described next will be an effective example for the case where, for example, an insured person suffering from a disease desires to receive a medical service and to apply a death benefit from his or her life insurance policy to the medical service, however, since the death benefit is intended for receipt by the bereaved family (after the insured person's death), the insured person does not have the money to receive the medical service in his or her lifetime. This is a system having the integrated form of the above session trade of a medical service in the medical treatment price adjusting system 100 or 200 with a session wherein a life insurance policy of an insured patient is traded, and a schematic diagram thereof is shown in FIG. 8. The life insurance policy trading means that, in the regular life insurance policy trading, a person who desires to be insured makes a bid for a life insurance policy presented at an ask price by an insurance company or, in the reverse life insurance policy trading, an insurance company makes a bid for a life insurance policy at an ask price presented by a person who desires to be insured and the insurance company finally sells the life insurance policy to the person who desires to be insured.

When a session for trading a life insurance policy is opened and an insurance company makes a successful bid for the commodity, then the life insurance policy is determined to be assigned or resold to the person who desires to be insured, the medical treatment price adjusting system subsequently applies the amount for assignment of the life insurance policy (including medical insurance) to the bid price for receiving a medical service, and opens the reverse session. That is, the assignment money owned by the patient but not given thereto during the lifetime thereof is used at the auction to pay for the patient receiving the medical service. Thus, this insurance policy is essentially a life insurance policy, and when a patient suffers from a disease after contracting for the life insurance policy, and therefore needs money before his or her death, it is possible to raise money for the cost of medical treatment at the session auction according to the present invention and can avoid agreeing to one-sided price adjustment by a medical institution. Accordingly, according to the system in this application example, it can be expected that the patient undergoes a medical consultation at a lower price than a conventional medical treatment price. Further, as in the aforementioned system 100 or 200, a donation is collected in the session and the amount corresponding to the donation may be subtracted from a medical treatment price to be demanded by the medical institution and paid by the insurance company.

In addition, the life insurance policy to be traded in the insurance service session includes a viatical and life settlement policy.

Next, features of the life insurance policy trading will be described.

1. Qualification to Participate in Session

It is desirable to request a person who desires to be insured (e.g., a patient) and to be a session member of the life insurance policy trading to undergo a periodic health examination and the session server can ask the person for disclosure of the result of the examination. The insurance company needs to understand the physical condition of the person who desires to be insured to judge the appropriateness of selling the life insurance policy. However, if the insurance company carries out this health examination, a fair price is needed. The patient pays this price, resulting in reduction of the insurance due therefor.

Bidders for the life insurance policy put up by the patient at the life insurance policy trading include insurance companies, and do not exclude the insurance company which puts the life insurance policy on sale. When the insurance company which puts the life insurance policy on sale finally accepts a bid to buy the commodity, it is considered that the profit of the insurance company to which the commodity is assigned increases since the procedures of assignment to another insurance company or the like can be simplified.

2. Adjustment of Insurance Due of Life Insurance Policy

It is preferable that the number of contractors of the life insurance policy being traded at the auction is displayed on the terminal connected to the session server, and the insurance premium due for the next month is changed in accordance with a change in the number of insurers in each month or furthermore, a result of simulation representing the relationship between the predicted number of contracted insurers and insurance premium due, to inspire a motivation to be insured.

As it can be said in general that an infant or an aged person pays higher prices to a medical institution than people in their twenties and thirties, an average medical treatment price differs depending on a patient's age. Accordingly, it is preferable that basic data for adjusting an insurance premium is on the basis of probability data obtained from the death rate of people in each age group. It is further preferable that personal information is presented by the patient who is a session member of the auction trade of the medical treatment price adjusting system 100 or 200. The reason is that an insurance premium is adjusted taking into consideration personal information of each patient since a lifestyle habit (particularly, smoking) greatly affects a prevalence rate of the patient.

3. Donation Function

The life insurance policy trading alone also has a function to accept a donation. Since the donation reduces the burden on an insurance company, the insurance company gives preferential treatment regarding an insurance premium to a donor, that is, reduces the insurance premium. This rule may be applied not only to a newly insured person but to an already insured person. The preferential amount can be varied on the basis of, for example, annual income and expenditure on the premise that the insurance premium of the donor is lower than that of a person who has not made any donation. It can be considered that insurance premiums of persons each of whom has made a donation more than once are uniformly reduced, or an insurance premium to be paid by a person next time will be treated more preferentially as the total amount of donations made by the person increases.

Further, it is preferable that an insurance premium of a person who has made a donation via the M bank is also treated preferentially. The M bank manages collected deposits, returns a part of the obtained fund to an insurance company, and the insurance company reduces insurance premiums of depositors of the M bank.

Instead of the direct transfer of donations to insurance companies, donations to insurance companies may be collected uniformly and then are reassigned to the insurance companies followed by determination of insurance premiums.

It is preferable that result information of donations (e.g., number of donations, total amount of donations, rate of donation to the asset/income of each donor) is stored in a database or a user object and displayed on a terminal in a comparable form with information of other donors. The reason is that, knowing donation results of other donors may inspire an intention a person to make a donation upon objective evaluation of his or her own donations.

The result information related to donations (numeric values and comments) may be usable as self appeal information to ask a third party for a large donation. A party who has made a large donation is rewarded to induce donations to the auction.

Thus, in the case of the life insurance policy trading, a donation leads to the reduction of an insurance premium of the donor and, as described above, the donor is qualified to receive the support of a donation from another party at the auction so as to receive a desired medical service at a reasonable price.

<Other Functions of Medical Treatment Price Adjusting System>

The following should be noted when actually operating the medical treatment price adjusting system according to the present invention.

(a) The management authority of the medical treatment price adjusting system demands a participant in the auction to comply with laws and regulations and strictly carry out an admission examination to prevent the leakage and the illegal use of personal information and business information between traders. Therefore, predetermined compliance with the management authority can be specified to have the session member make an oath in advance not to use the auction trade for an illegal purpose.

(b) A patient who desires to put up a commodity at the auction of the medical treatment price adjusting system according to the present invention may be obliged to contract for medical insurance from an insurance company related to the management authority of the medical treatment price adjusting system.

(c) Since an auction is originally executed on the basis of the adjustment of a price on the basis of competition among a plurality of sellers, it is meaningless without a plurality of bidders present at the auction. Accordingly, a plurality of medical institutions have made contracts with the management authority of the medical treatment price adjusting system to participate in the auction as session members as a precondition. In addition, the session members include general members (general citizens and possible patients), members of medical institutions (hospitals and doctors) and members of insurance and financial institutions.

Furthermore, in the case of a network auction, there is a fear that another person gets around the regulations of the aforementioned compliance and participates in the auction by disguising himself as an authenticated participant. Therefore, the medical treatment price adjusting system is preferably provided with the following functions. For example, during the time a patient participates in the session, there are detected (a) a voice (by a microphone), (b) an expression on the face (by a camera), (c) an iris (by a camera), (d) a retina (by a camera), (e) voice printing (by dedicated measuring equipment), (f) a body temperature (by a clinical thermometer), (g) a pulse (by dedicated measuring equipment), (h) a brain wave (by dedicated measuring equipment), (i) a blood pressure (by dedicated measuring equipment), (j) a cutaneous electrical resistance (by dedicated measuring equipment) and the like to be sent to the session server in real time mode or at a predetermined time intervals via various biographical information detection devices (the above measuring equipment in parentheses for detecting various pieces of biometrics information) installed in the periphery of the patient terminal (x). The same functions are required in the case where a medical institution, an insurance company and the like participate in the session.

(A) Personal Authentication Function:

The session server compares the sent information about the above physical and behavioral characteristics (biometrics information) of a person with the master data collected from the patient and registered in the database at the time of the admission examination and, if the two pieces of information do not match each other, the session server stops allowing the person to participate in the session upon determination that the person is not the one permitted to be registered. In addition, a medical institution may be authenticated in the same manner as a person. In this case, only an institution registered in advance as a medical institution has the right to participate in the auction.

(B) Lie Detecting Function:

Such a trade related to a medical treatment or insurance as the trade according to the present invention is different from other commodity trades in that, even when an authenticated person participates in the session, the health condition of the person needs to be understood or there is a great importance in confirming that presented information is correct. Accordingly, the aforementioned biometrics information is detected and used to detect a lie. Specifically, the following should be observed (a) a shaking voice or a falsetto, (b) a sulky facial expression, (g) rapid rise of the pulse rate, (i) rapid rise of the blood pressure, (j) a change in the cutaneous electrical resistance, cause by sweat, and the like.

Furthermore, (b) a facial expression, (f) body temperature, (g) pulse, (i) blood pressure and the like may be analyzed and compared with data of a human being in a normal condition to simply understand the health information of the participant. An emotional sense can also be known from (a) the voice, (b) a facial expression, (g) the pulse rate, (i) blood pressure and the like. The personal authentication, the lie confirmation, the emotion recognition, and the health check can be thus carried out simultaneously on the basis of the biometrics information of the participant of the session resulting in further improvement of the reliability of a trade in a session.

In addition, the above-described functions are provided not only for the medical treatment price adjusting system but also for the life insurance policy trading.

While the invention has been described with reference to a specific embodiment, the description is not meant to be construed in a limiting case. Various modifications of the disclosed embodiment, as well as other embodiments of the invention, will be apparent to persons skilled in the art upon reference to this description. It is therefore contemplated that the appended claims will cover any such modifications or embodiments as fall within the true scope of the invention.

What is claimed is:

1. A medical cost adjusting method for determining a medical cost for a medical service provided by a medical institution to a patient, implemented using a computer system including:

at least one patient terminal used by at least one patient, at least one medical institution terminal used by at least one medical institution, at least one third party terminal used by at least one third party who is not a session member, and a session server in communication with the at least one patient terminal and the at least one medical institution terminal via a communication network, wherein the session server stores and processes data entered from the at least one patient terminal, the at least one medical institution terminal, and the at least one third party terminal, the method comprising the steps of:

(a) conducting a regular auction to set the price of a medical treatment to be provided to a patient by a medical institution by:

(i) receiving at the session server via the communication network an offered medical cost for the medical treatment as an ask price of at least one medical institution, using the session server, transmitted from the at least one medical institution terminal; and (ii) receiving at the system server via the communication network an amount offered to be paid by the at least one patient for said medical service as a bid price of the at least one patient, transmitted from the at least one patient terminal;

(b) using the session server to adjust a bid price and an ask price so that an auction trade can be carried out, by:

(i) adding to the bid price and subtracting from the ask price amounts of portions of proceeds of a lottery held among a plurality of unspecified many parties, wherein a winning lottery number thereof is determined at least on the basis of a value obtained by converting an average stock price in at least one stock market to a selected currency based on a currency exchange rate at a predetermined time; and (ii) adding to the bid price or subtracting from the ask price the amount of a donation to a patient or to a medical institution, respectively, from a third party who is not a session member;

(c) using the session server to determine session members as parties who are directly concerned in the setting of a price for the medical treatment by combining the regular auction with a reverse auction;

(d) using the session server to execute an auction trade by said session members; and (e) using the session server to end the auction when at least one medical institution presents an ask price which, as adjusted in step (b), is lower than or equal to said bid price presented by said at least one patient, as adjusted in step (b), or when a predetermined auction ending time is reached.

2. The method according to claim 1, wherein in said step of using the session server to execute an auction trade, when a maximum bid price is presented by said at least one patient, said bid price is adjusted to be less than the maximum bid price or a bid is made within the range of not more than said maximum bid price.

3. The method according to claim 1, wherein in said step of using the session server to execute an auction trade, the appropriateness of a price adjustment of said ask price or said bid price is evaluated on the basis of statistical analysis of results of ballots or questionnaires collected from parties to the auction trade other than said session members to adjust said ask price or said bid price.

4. The method according to claim 1, wherein biographical information of said at least one patient is detected during an auction and compared with master data of said at least one patient registered in advance for personal authentication, lie detection, emotion recognition or health checking of said at least one patient.

5. The method according to claim 4, wherein said biographical information of said at least one patient includes at least one of a voice, an expression on a face, an iris, a retina, a voice printing, a body temperature, a pulse, a brain wave, a blood pressure and a cutaneous electrical resistance.

6. The method according to claim 1, wherein pieces of information presented by said at least patient and said at least one medical institution are stored in a database as user objects, wherein:

a) when said at least one patient and said at least one medical institution participate in a reverse auction trade, in which the patient is an active party in obtaining the medical treatment and the at least one medical institution is a passive party in providing the medical treatment, a user object created from information presented by said at least one patient is defined as having an active/obtaining attribute, and a user objected created from information presented by said at least one medical institution is defined as having a passive/providing attribute, and b) when said at least one patient and said at least one medical institution participate in a regular auction trade, in which the patient is a passive party in obtaining the medical treatment and the at least one medical institution is an active party in providing the medical treatment, a user object created from information presented by said at least one patient is defined as having a passive/obtaining attribute, and a user object created from information presented by said at least one medical institution is defined as having an active/providing attribute.

7. The method according to claim 6, wherein when said matching is carried out to determine session members as parties concerned in an auction trade, the session server uses any one of the active/obtaining, passive/providing, passive/obtaining and active/providing attributes to determine whether to generate a regular auction group or a reverse auction group.

8. The method according to claim 1, wherein in said step (b), when said matching is carried out to determine session members as parties concerned in an auction trade, the pieces of information also include at least contracted insurance information.

* * * * *